(12) United States Patent
Hsu et al.

(10) Patent No.: US 12,186,665 B2
(45) Date of Patent: Jan. 7, 2025

(54) SHOOTING GAME SYSTEM (71) Applicant: Tien Shu Hsu, Taichung (TW)

(72) Inventors: Shun Tsung Hsu, Taichung (TW); Chang Yi Wang, Taichung (TW)

(73) Assignee: Tien Shu Hsu, Taichung (TW)

( * ) Notice: Subject to any disclaimer, the term of this patent is extended or adjusted under 35 U.S.C. 154(b) by 225 days.

(21) Appl. No.: 18/013,391

(22) PCT Filed: Jun. 30, 2020

(86) PCT No.: PCT/CN2020/099592
§ 371 (c)(1),
(2) Date: Dec. 28, 2022

(87) PCT Pub. No.: WO2022/000346
PCT Pub. Date: Jan. 6, 2022

(65) Prior Publication Data
US 2023/0249075 A1 Aug. 10, 2023

(51) Int. Cl.
*A63F 13/837* (2014.01)
*A63F 13/20* (2014.01)
(Continued)

(52) U.S. Cl.
CPC .............. *A63F 13/56* (2014.09); *A63F 13/20* (2014.09); *A63F 13/40* (2014.09); *A63F 13/46* (2014.09); *A63F 13/837* (2014.09)

(58) Field of Classification Search
CPC ......... A63F 13/56; A63F 13/46; A63F 13/837
See application file for complete search history.

(56) References Cited

U.S. PATENT DOCUMENTS

| 8,128,476 B1 * | 3/2012 | Sidhu ................. A63F 3/00643 463/16 |
| 2010/0056247 A1 * | 3/2010 | Nicely ................ G07F 17/3211 463/16 |

(Continued)

FOREIGN PATENT DOCUMENTS

| CN | 106492450 A | 3/2017 |
| CN | 108159704 A | 6/2018 |
| CN | 108211361 A | 6/2018 |

*Primary Examiner* — James S. McClellan
(74) *Attorney, Agent, or Firm* — MUNCY, GEISSLER, OLDS & LOWE, P.C.

(57) ABSTRACT

A game processing element screens, according to a determination condition of a particular object, at least one shot object satisfying the determination condition on an immediate game screen, and generates by calculation an immediate total magnification, the odds multiple of the particular object comprising at least the immediate total magnification; when the particular object is hit by an attack bullet, the game processing element determines, according to a second probability, whether the particular object is shot down, the product of the second probability and the odds multiple of the hit particular object being equal to the return to player (RTP). On this basis, the second probability is in negative correlation with the odds multiple of the particular object. Therefore, when the particular object is shot down, a player can obtain the sum of the odds multiple of the at least one shot object satisfying the determination condition; moreover, the at least one shot object satisfying the determination condition can be presented to be shot down on the game screen, and the game effect of the particular object is enabled to be truly presented.

9 Claims, 9 Drawing Sheets (51) Int. Cl.
*A63F 13/40* (2014.01)
*A63F 13/46* (2014.01)
*A63F 13/56* (2014.01)

(56) References Cited

U.S. PATENT DOCUMENTS

| | | |
|---|---|---|
| 2011/0034239 A1 | 2/2011 | Collette et al. |
| 2012/0122561 A1* | 5/2012 | Hedrick ................ A63F 13/792 463/25 |
| 2014/0087869 A1 | 3/2014 | Thorne |
| 2016/0343211 A1 | 11/2016 | Graboyes Goldman et al. |
| 2020/0070052 A1* | 3/2020 | Suek ....................... A63F 13/30 |

\* cited by examiner

SHOOTING GAME SYSTEM

FIELD OF THE INVENTION

The invention relates to a shooting game, in particular to an operating system of the shooting game.

BACKGROUND OF THE INVENTION

In the prior art, a game system provides a shooting game which is allowing a player to control a shooting element on a game picture by operating an operating element, so that the player can freely select a direction to shoot; after the player pays a wager score by operating the operating element, the game system allows the shooting element to generate an attack bullet; after the attack bullet hits at least one shooting target on the game picture, the game system determines whether the shooting target is hit down according to a probability; and after the shooting target is hit down, the player obtains a corresponding score according to an odds multiple of the shooting target and the wager score.

In the shooting game, different shooting targets have different values of the odds multiple, and the shooting game has a return to player (RTP) which is fixed, so that the probability is determined according to the odds multiple of the shooting target, that is, different shooting targets have different values of the probability. Specifically, if the return to player (RTP) is 90%, when the odds multiple of the shooting target is 10, the probability should be 9% (RTP=odds multiple*probability). When the attack bullet hits the shooting target, the shooting target is determined to hit down with a probability of 9%; and when the shooting target is hit down, the player can obtain a score of the wager score*the odds multiple.

To further enhance the player's enjoyment, in the shooting game, the shooting target comprises at least one special target, and different special targets have different game effects. When any one of the special target is hit down, a corresponding game effect may be generated, including but not limited to: 1, equivalently hit down all of the shooting target on the game picture; 2, equivalently hit down the shooting target with the odds multiple less than a specified value on the game picture; 3, equivalently hit down the shooting target within a specified distance from the special target, and the odds multiple of the shooting target is lower than a specified value; and, 4. equivalently hit down the shooting target having a specified characteristic, wherein the specified characteristic may belong to the same family, have a particular biological characteristic, biological species, etc.

In order to make the game picture more appealing to the player, conventional techniques display a game special effect corresponding to the game effect of the special target on the game picture. For example, the game effect of the special object is the afore-mentioned third item. On the game picture, the special target may be represented as a bomb. When the special target is hit down, the game special effect may cause the bomb to explode; in the recognition of a player, the bomb explosion may hit down the shooting target within the game picture that meets the specified distance and the odds multiple of the shooting target is less than the specified value, and the player may obtain the sum of the odds multiples for the shooting target which is hit down.

However, in the conventional art, in order to maintain the return to player (RTP) at a fixed value, the odds multiple of the special target is given in advance and cannot be changed; and when the attack bullet hits the special target, the probability of determining whether to hit down the special target is fixed.

That is, in practice, when hitting down the special target, the odds multiple obtained is fixed and not processed in accordance with the game effect and an instant game picture. As the example described above, the shooting target will not be hit down only if the shooting target meets the specified distance and the odds multiple of the shooting target is lower than the specified value, and even the game special effect presented on the game picture is fixed. That is, the game effect and the game special effect do not vary along with the number of the shooting target on the instant game picture. A player who observes carefully can perceive that the shooting target which should be hit down on the game picture is not hit down, the game effect does not completely correspond to the instant game picture and is unreasonable, and at the same time, the sum of the odds multiple of the at shooting target which should be hit down on the game picture and the sum of the odds multiple actually obtained by the player are not matched, so the player may then question about the game system that the authenticity and playability of the shooting game are reduced.

SUMMARY OF THE INVENTION

The invention mainly aims to disclose a shooting game system which displays reasonable game pictures so as to improve the authenticity and playability of the game.

To achieve the above object, the present invention discloses a shooting game system for at least one player to play a shooting game to generate a game process. The shooting game includes at least one shooting target and a given value as a rate of return to player (RTP); and each of the at least one shooting target includes an odds multiple. During the game process, the at least one shooting target is randomly displayed on a game picture; and after each player pays a wager score, an attack bullet is generated on the game picture to shoot the at least one shooting target displayed on the game picture; and after the attack bullet hits any one of the at least one shooting target, the shooting game system determines whether the shooting target is hit down according to a first probability. Further, the product of the odds multiple of the shooting target to be hit and the first probability correspondingly is equal to the given value. Further, the shooting game system comprises a game processing element, a display screen, at least one personal operation element and at least one shooting element.

The game processing element controls the operation of the shooting game and generates the game picture according to the game process. The at least one shooting target comprises at least one special target, and each of the at least one special target is associated with a judgment condition. When the special target appears on the game picture, the game processing element determines according to the judgment condition, and the game processing element screens out the at least one shooting target, which meets the judgment condition, from the game picture in real time. The game processing element calculates the sum of the odds multiples of each of the at least one shooting targets, which meet the judgment condition, and to generate a real-time total multiplier. Further, the odds multiple of the special target at least comprise the real-time total multiplier.

The display screen is connected with the game processing element and presents the game picture. The at least one personal operation element is connected with the game processing element, and the at least one personal operation element is respectively configured for the at least one player to operate to generate an operation instruction to change the game process, wherein the operation instruction comprises a shooting command The at least one shooting element is connected with the game processing element, the at least one shooting element respectively corresponds to the at least one personal operation element, and the at least one shooting element receives the shooting command corresponding to the at least one personal operation element to commend the shooting element firing the attack bullet. If the special target is hit by the attack bullet, the game processing element judges whether the special target is hit down at a second probability, and the product of the second probability and the odds multiple of the special target to be hit is equal to the given value; and when the special target is determined to be hit down, the game processing element generates a game effect which is hitting down the at least one shooting target meeting the judgment condition together.

Accordingly, during the game process, the at least one shooting target on the game picture is changed (appearing, moving and disappearing on the game picture) in real time. Namely, the at least one shooting target screens out to meet the judgment condition of the special target will also change. Hence, the sum of each of the odds multiple of the at least one shooting target is also changed. Moreover, the given value (the rate of return to player (RTP)) is a constant. Since the product of the second probability and the odds multiple of the special target to be hit is equal to the given value, the second probability is related to the odds multiple of the special target in negative correlation. Thus, the second probability for determining whether the special target is hit down is changed based on the sum of each of the odds multiple of the at least one shooting target on the game picture in real time. The greater the number of the at least one shooting target meeting the judgment condition is, the higher the odds multiple of the special target is, the lower the second probability is, and the rate of return to player (RTP) remains constant. Therefore, when the player judges that it is hit down, the at least one shooting target on the game picture in real time is really determined according to the judgment condition of the special target and to generate a game effect correctly, and the at least one shooting target meeting the judgment condition is realistically hit down on the game picture. Then, the player obtains the sum of the odds multiples of the at least one shooting target meeting the judgment condition, and the invention increases the authenticity and playability of the game to meet the expectations of the player.

DETAILED DESCRIPTION OF THE PREFERRED EMBODIMENTS

With regard to the detailed description and technical aspects of the invention, reference is now made to the following descriptions taken in conjunction with the accompanying drawings:

Referring to FIG. 1, FIG. 2, FIG. 3 and FIG. 4, the invention is a shooting game system provided for at least one player to play a shooting game and generate a game process. The shooting game includes at least one shooting target 50 and a given value as a rate of return to player (RTP), each shooting target 50 having an odds multiple. During the game, the at least one shooting target 50 is randomly displayed on a game picture 21; after each player pays a wager score, an attack bullet 22 is generated on the game picture 21 to shoot the at least one shooting target 50 displayed on the game picture 21; after the attack bullet 22 hits any one of the at least one shooting target 50, the shooting game system determines whether to hit down the shooting target 50 according to a first probability; and after the shooting target 50 is determined to be hit down, the player obtains a score according to the odds multiple and the wager score correspondingly. The product of the odds multiple of the shooting target 50 and the first probability corresponding to the shooting target 50 is equal to the given value. In an embodiment, the shooting game system comprises a game processing element 10, a display screen 20, at least one personal operation element 30, and at least one shooting element 40. The game processing element 10 controls the operation of the shooting game, and generates the game picture 21 according to the game process. The display screen 20 is connected with the game processing element 10 to present the game picture 21. Further, the at least one personal operation element 30 is connected with the game processing element 10, and is respectively provided for the at least one player to operate to generate an operation instruction to change the game process.

Figure 2:
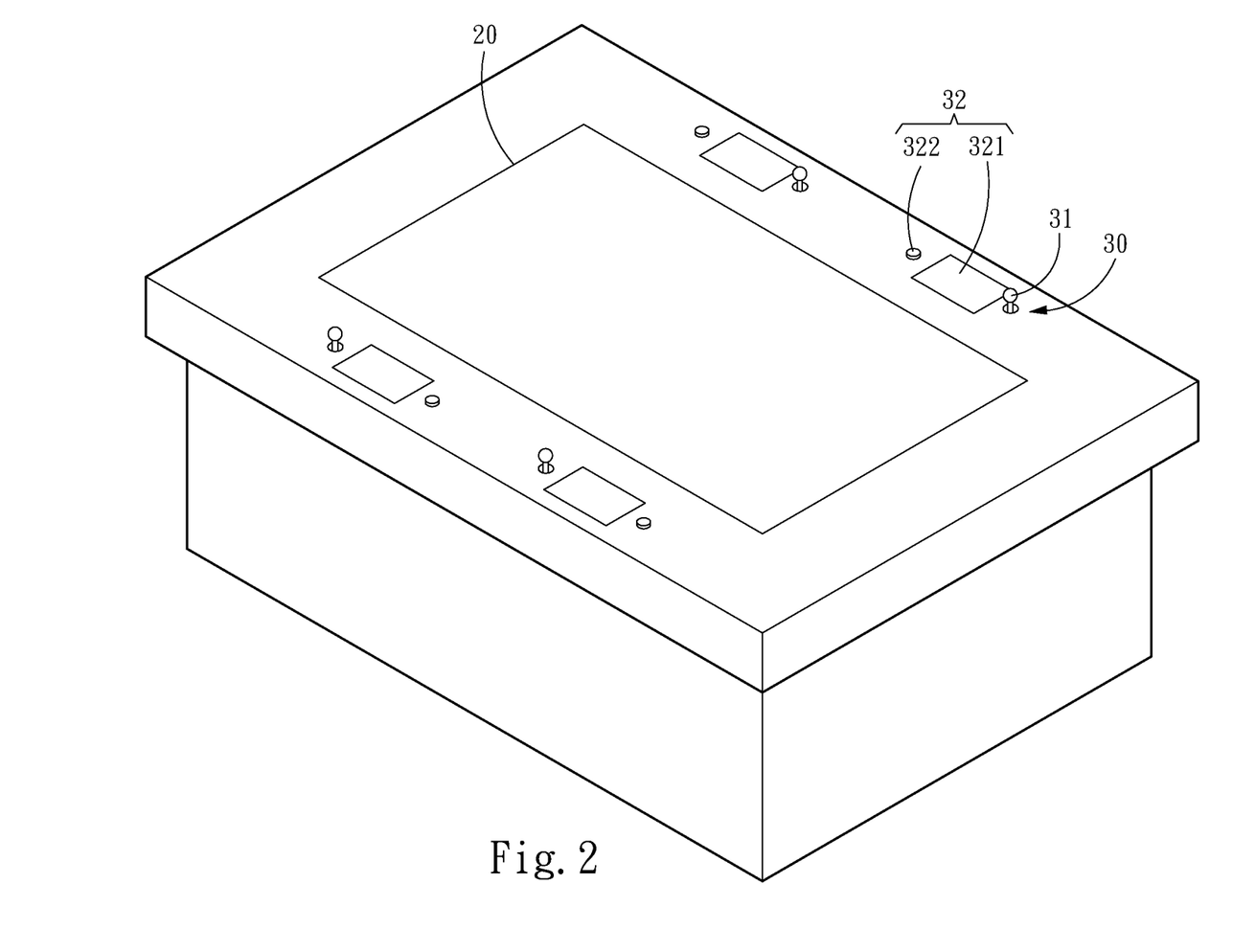
FIG. 2 is a schematic diagram of a game machine table of the present invention.
Figure 3:
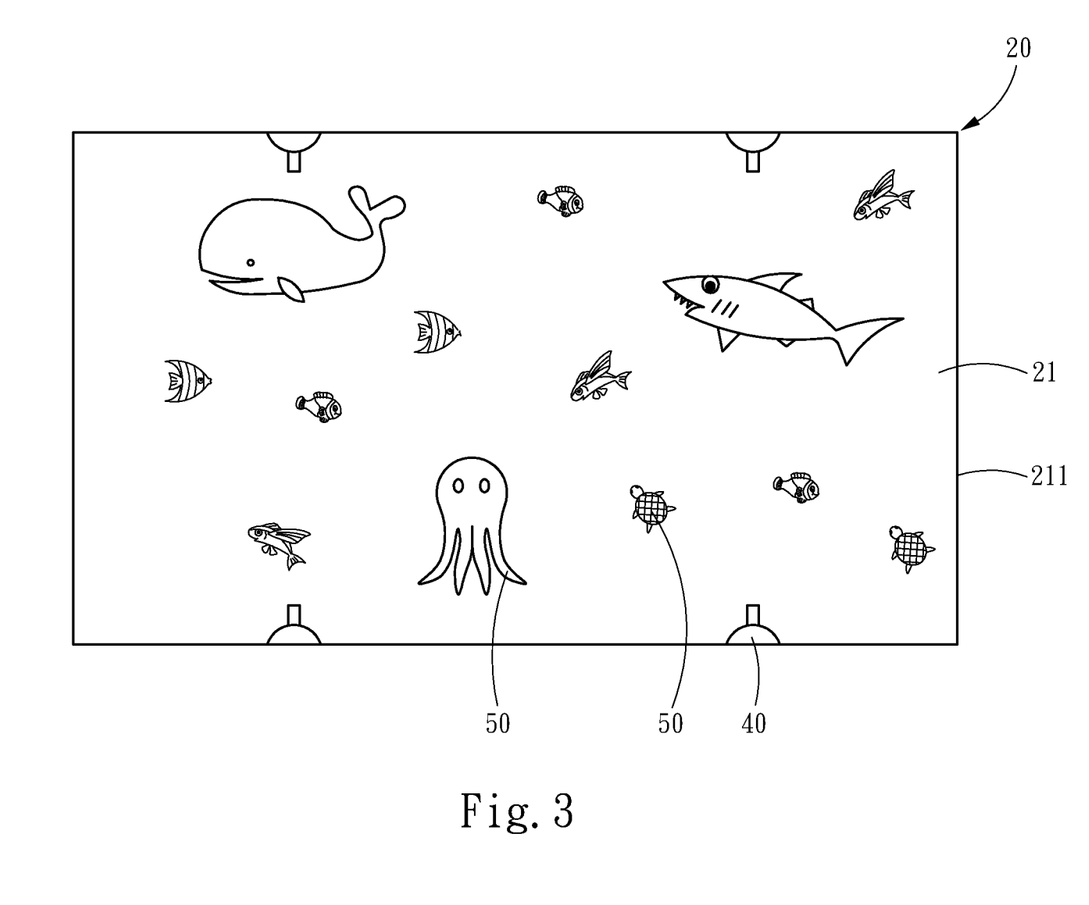
FIG. 3 is a first schematic diagram of a game picture of the present invention.

As shown in FIG. 2, each personal operation element 30 is operated by a player, and the personal operation element 30 comprises a directional control element 31 and an input interface 32. The input interface 32 comprises a wager score key 321 operated by the player to change the wager score, and a function key 322 acts as a shooting switch corresponding to the shooting element 40 for operation by the player to control the shooting element 40 to fire the attack bullet 22 and attack the at least one shooting target 50. In an embodiment, the wager score key 321 is a touch screen to be used as a personal screen for the player. In an embodiment, the directional control element 31 is a joystick for the player to rotate a shooting direction of the shooting element 40 by swinging the joystick.

Figure 1:
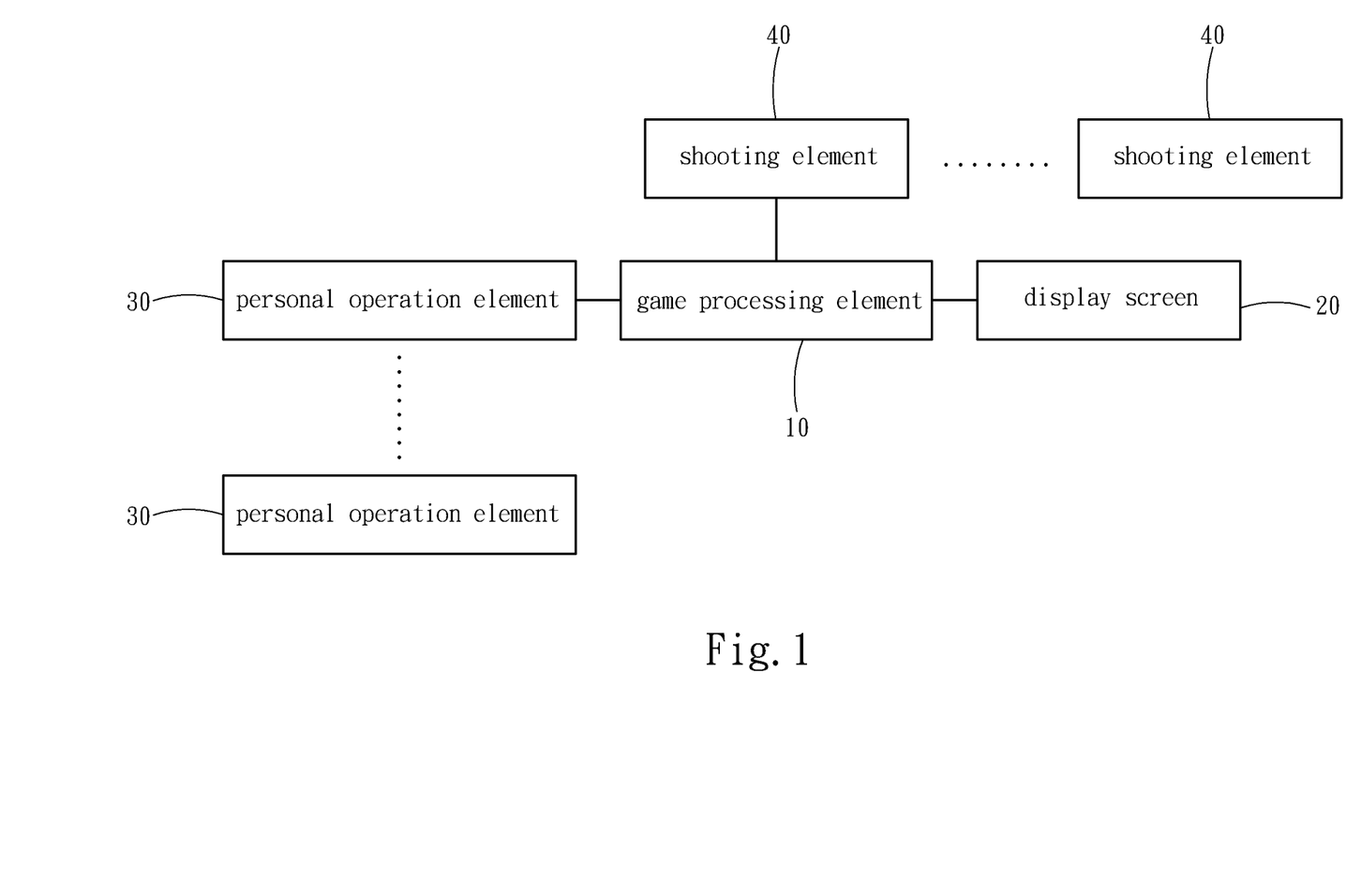
FIG. 1 is a block diagram of a system of the present invention.
Figure 4:
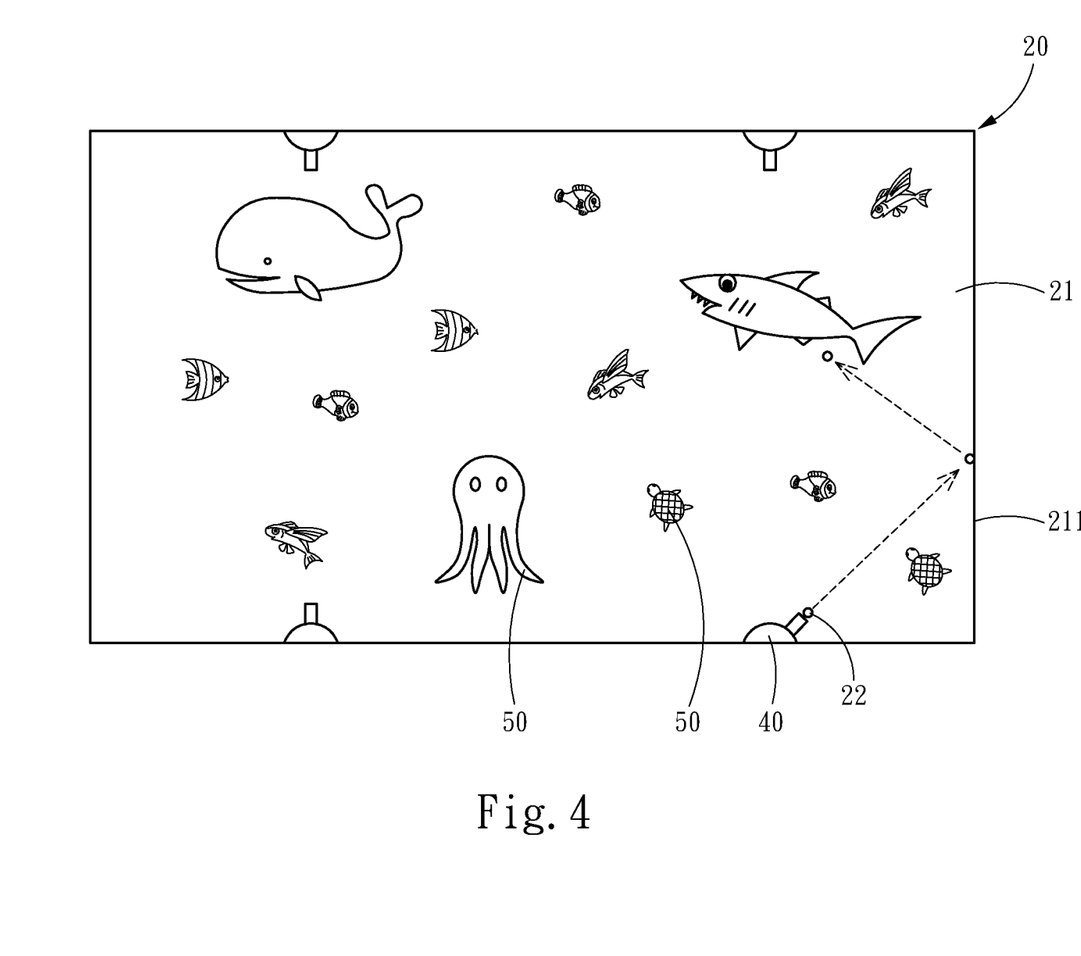
FIG. 4 is a second schematic diagram of the game picture of the present invention.

Referring to FIG. 1, FIG. 2 and FIG. 4, the operation instruction comprises a shooting command The at least one shooting element 40 is connected with the game processing element 10, and respectively corresponds to the at least one personal operation element 30. The at least one shooting element 40 receives the shooting command corresponding to the at least one personal operation element 30, so that the shooting element 40 fires the attack bullet 22. Further, the attack bullet 22 on the game picture 21 flies in a straight line, and then the attack bullet 22 is reflected to continue fling in a straight line after colliding with a boundary 211 of the game picture 21.

Figure 5A:
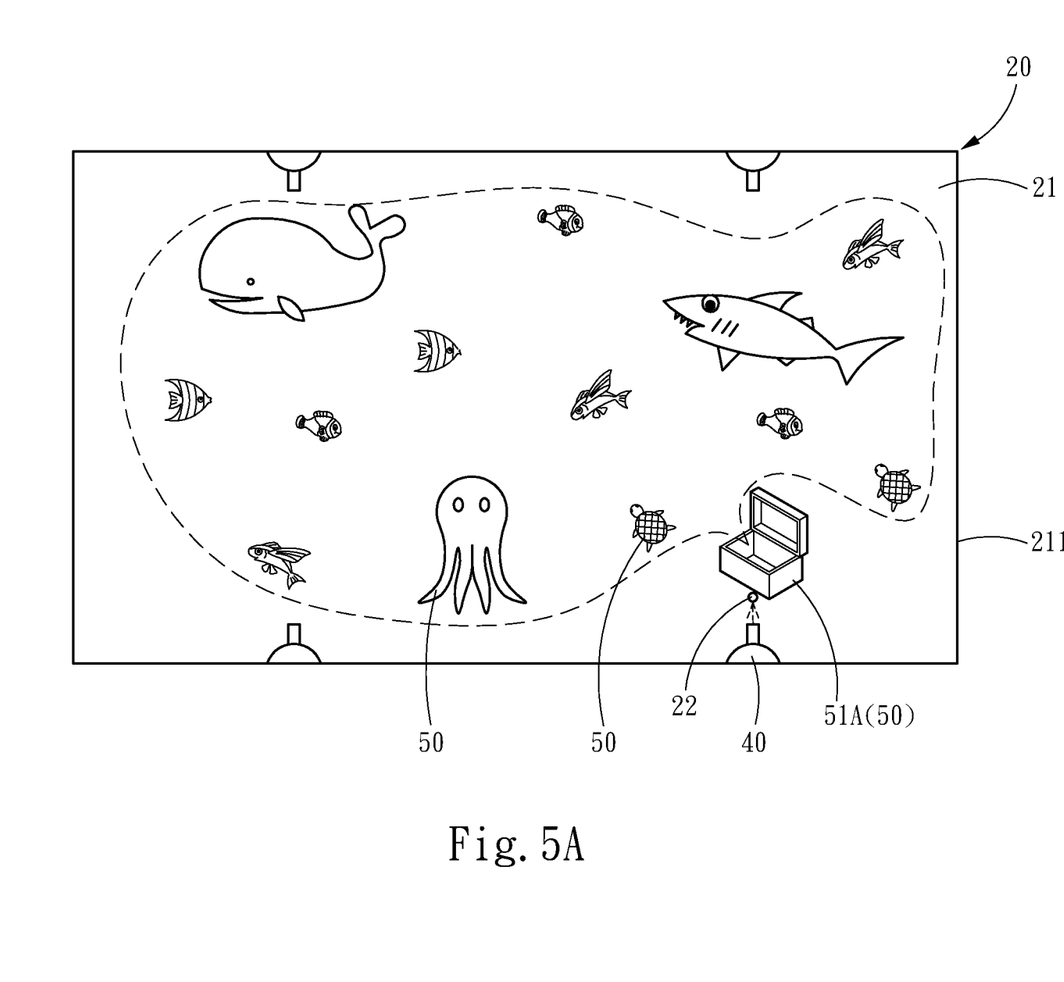
FIG. 5A is a first schematic diagram of a game picture according to a first embodiment of the present invention.
Figure 5B:
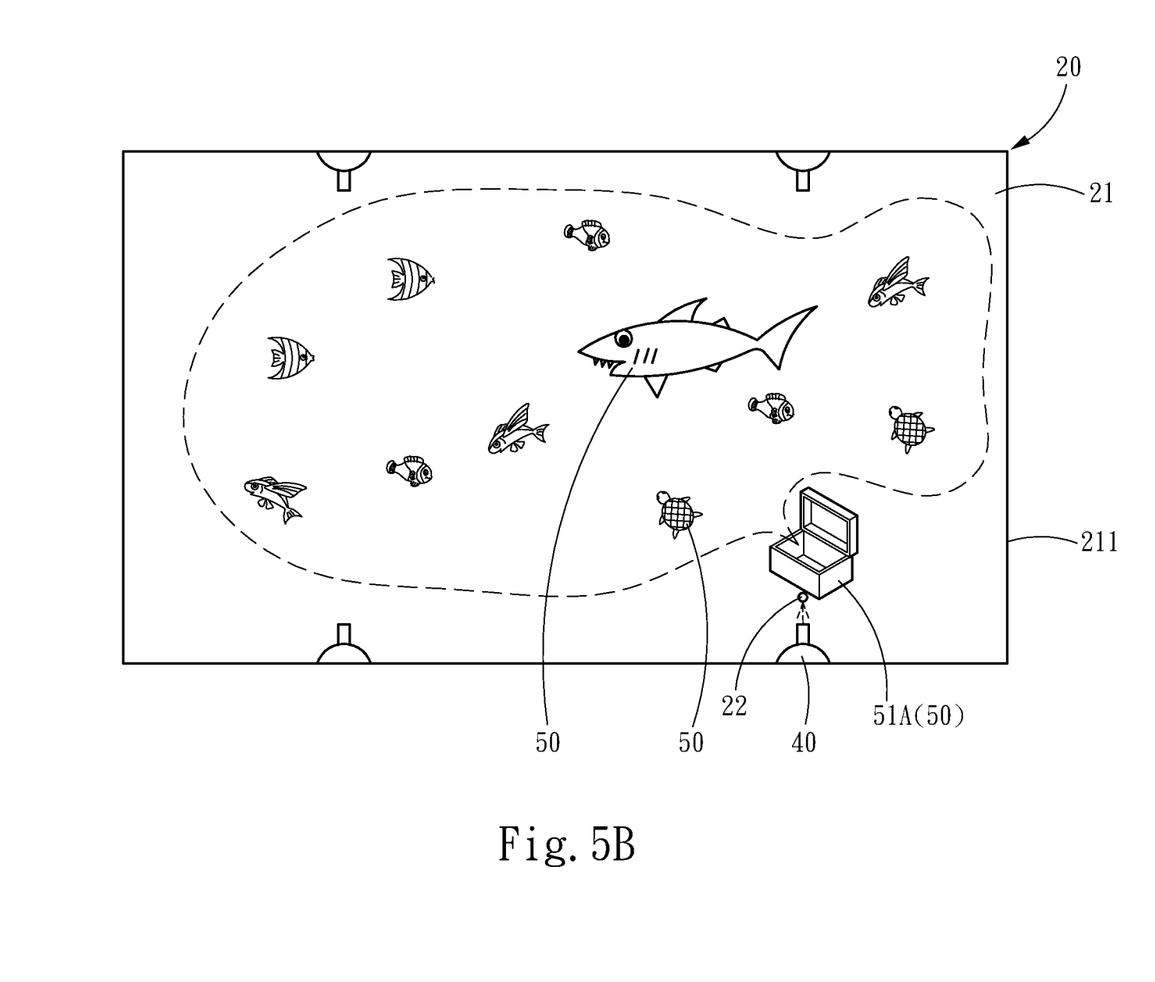
FIG. 5B is a second schematic diagram of the game picture according to the first embodiment of the present invention.
Figure 6A:
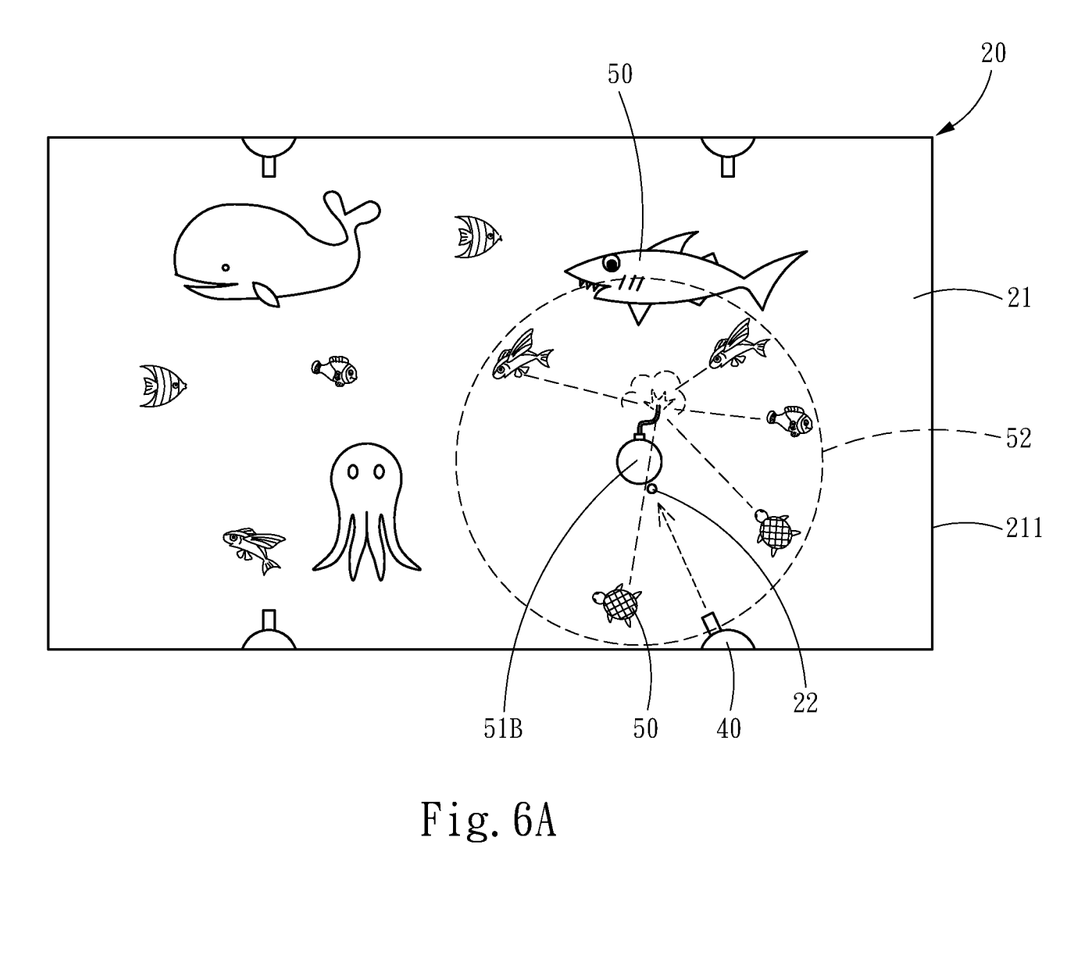
FIG. 6A is a first schematic diagram of a game picture according to a second embodiment of the present invention.
Figure 7:
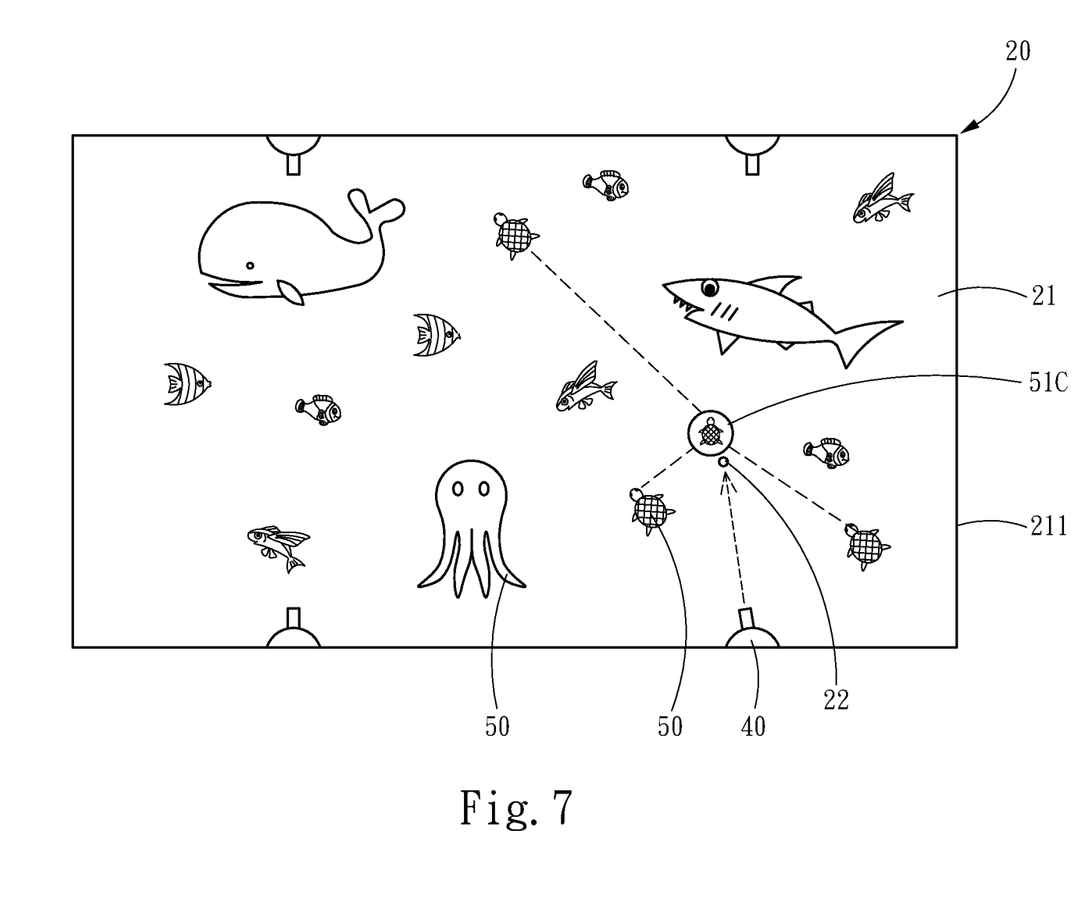
FIG. 7 is a schematic diagram of a game picture according to a third embodiment of the present invention.

Referring to FIG. 1, FIG. 5A and FIG. 5B, according to a first embodiment of the invention, the at least one shooting target 50 comprises at least one special target 51A, each of which is associated with a judgment condition. The game processing element 10 determines based on the judgment condition when the special target 51A appears on the game picture 21. The game processing element 10 screens out the at least one shooting target 50, which meets the judgment condition, from the game picture 21 in real time; and an real-time total multiplier is generated by calculating the sum of all odds multiples of each shooting target 50, which meet the judgment condition. Thereby, the odds multiple of the special target 51A at least comprise the real-time total multiplier. For example, in the first embodiment, the odds multiple of the special target 51A is equal to the real-time total multiplier; alternatively, as the second and third embodiments described below, the odds multiple of the special target 51B, 51C (as shown in FIG. 6A and FIG. 7A) is the sum of the value of the real-time total multiplier with a basic multiple, wherein the basic multiple has different values along with the special target 51B, 51C.

In the first embodiment, if the special target 51A is hit by the attack bullet 22, the game processing element 10 determines whether the special target 51A is hit down according to a second probability, wherein the product of the second probability and the odds multiple of the special target 51A is equal to the given value. Meanwhile, if the special target 51A is hit down upon determination, the game processing element 10 generates a game effect corresponding to the special target 51A and a game special effect corresponding to the game effect, and the game picture 21 displays the game special effect. In the embodiment, the game effect is hitting down the shooting target 50 meeting the judgment condition together; and the game special effect is to display an animation, which is a process in which the shooting target 50 meeting the judgment condition is hit down together.

In this embodiment, the judgment condition is that the at least one shooting target 50 does not belong to the special target 51A (including the special target 51B, 51C shown in FIG. 6A and FIG. 7A) and appears on the game picture 21. Namely, as long as the at least one shooting target 50 does not belong to the special target 51A, 51B, 51C and appears on the game picture 21, the at least one shooting target 50 meets the judgment condition.

As shown in FIG. 5A, in one embodiment, there are ten smaller shooting targets 50 and three larger shooting targets 50 on the game picture 21 in real time. For convenience of explanation, the odds multiple of each of ten smaller shooting targets 50 is regarded as five times, and the odds multiple of each of three larger shooting targets 50 is regarded as ten times. Thus, the value of the real-time total multiplier is 5*10+10*3=80. In this embodiment, the odds multiple of the special target 51A is equivalent to the real-time total multiplier; that is the odds multiple of the special target 51A is 80. Further, assuming that the given value (i.e., the rate of return to player (RTP)) is 90%, namely, the second probability*80=90%. Thus, the second probability is extrapolated to 1.125%. That is, when the special target 51A is hit, the special target 51A is determined to be hit down with a probability of 1.125%. In other words, the game effect of the special target 51A is to hit down all the shooting targets 50 on the game picture 21, with the value of the real-time total multiplier obtained by the player is 80.

As further shown in FIG. 5B, in the same embodiment, if ten smaller shooting targets 50 and one larger shooting target 50 only remain on the game picture 21 in real time, the real-time total multiplier now is 5*10+10*1=60. Similarly, it can be inferred that the second probability is 1.5% from the second probability*60=90%. That is, when the special target 51A is hit, the special target 51A is determined to be hit down with a probability of 1.5%, so that the value of the real-time total multiplier obtained by the player is 60.

Comparing FIG. 5A and FIG. 5B with the prior art, it can be seen that under the same situation that hitting the special target 51A down, the player of the prior art will get the same odds multiple and the same game effect. However, obviously, the player of the invention will obtain different odds multiples (like the real-time total multiplier) and different game special effects based on different numbers of the at least one shooting target 50 displayed on the game picture 21 in real time of FIG. 5A and FIG. 5B. Thus, the invention effectively solves the problem that the conventional game special effects cannot be instantly reflected on the game picture. In turn, it causes problems that the game result are not compatible with game pictures displayed on the display screen.

In contrast with the prior art, the present invention provides the at least one shooting target 50 on the game picture 21 in real time to proceed with determination according to the judgment condition of the special target 51A. That is, the at least one shooting target 50 meeting the judgment condition is realistically hit down on the game picture 21, and the player can obtain the sum of the odds multiples of the at least one shooting target 50 which meets the judgment condition, so as to increase the authenticity and playability of the game. In addition, by changing the second probability, the rate of return to player (RTP) is kept constant to avoid the problem of business benefit loss.

Figure 6B:
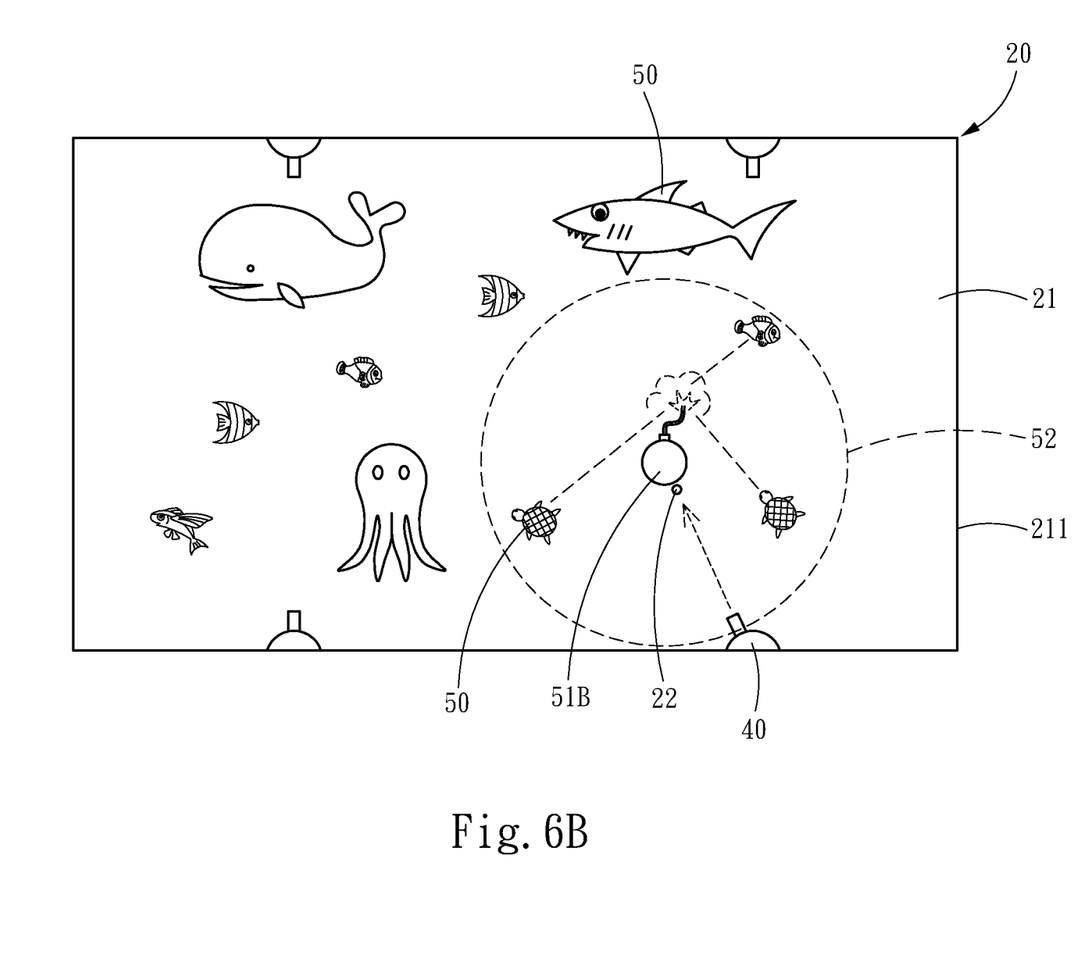
FIG. 6B is a second schematic diagram of the game picture according to the second embodiment of the present invention.

Referring to FIG. 6A and FIG. 6B, a second embodiment of the invention is shown. Compared with the first embodiment, the special target 51B is displayed on the game picture 21, and the judgment condition of the special target 51B is that the at least one shooting target 50 does not belong to the special target 51B (including the special target 51A, 51C shown in FIG. 5A and FIG. 7A) and is within a specified distance from the special target 51B. The odds multiple is lower than a specified value. Here, the specified distance is shown as a dotted line range 52 in FIG. 6A and FIG. 6B, and the specified value is specified as 9.

As the game picture 21 shown in FIG. 6A in real time, the at least one shooting target 50 within the specified distance has five smaller shooting targets 50 and one larger shooting target 50 in total. In one embodiment, the odds multiple of the special target 51B is the sum of the real-time total multiplier and a basic multiple. For convenience of explanation, in this embodiment, the basic multiple is specified as 5, the odds multiple of each of five smaller shooting targets 50 is regarded as five times, and the odds multiple of the larger shooting target 50 is regarded as ten times. Under this condition, the odds multiple of the larger shooting target 50 exceeds the specified value, so the judgment condition is not met, and therefore the value of the real-time total multiplier is 5*5+5=30. That is, the second probability*30=90%, and thus the second probability is extrapolated to 3%. That is, when the special target 51B is hit, the special target 51B is determined to be hit down with a probability of 3%, so that the value of the real-time total multiplier obtained by the player is 30.

As the game picture 21 further shown in FIG. 6B in real time, at different points in time, the at least one shooting target 50 within 25 the specified distance has a total of three smaller shooting targets 50. Accordingly, the real-time total multiplier is 3*5+5=20, so that the second probability*20 =90%, and thus the second probability is extrapolated to 4.5%. That is, when the special target 51B is hit, the special target 51B is determined to be hit down with a probability of 4.5%, and the value of the real-time total multiplier that the player obtained is 20.

A brief description of the second embodiment regarding the game effect and the game special effect is as follows. The game effect is that the at least one shooting target 50 meeting the judgment condition will be hit down, and the game special effect allows the player to understand the game effect in an animated manner. In this embodiment as an example, the judgment condition has two parameters, i.e. the specified distance and the specified value. The appearance of the special target 51B is shown as a bomb, an effective killing distance of the bomb is regarded as the specified distance, and an effective killing power of the bomb determines the specified value. If the attack bullet 22 hits down the special target 51B, the game effect is the bomb explosion to hit down the at least one shooting target 50 within the effective killing distance, and the number of the at least one shooting target 50 to be hit down is lower than the specified value, so that the game special effect is an animation of the process of the bomb explosion and hitting down the at least one shooting target 50.

Referring to FIG. 7, for a third embodiment of the invention, the judgment condition is that the at least one shooting target 50 does not belong to the special target 51C (including the special target 51A, 51B shown in FIG. 5A and FIG. 6A) and includes a specified characteristic that is defined as a creature of the same population, such as a turtle. For example, as shown in FIG. 7, if the at least one shooting target 50, which is hit down, is the special target 51C, all turtles as the shooting targets 50 on the game picture 21 are hit down together. As shown in FIG. 7, the at least one shooting target 50, which is also a turtle, shown in dotted lines is to be hit down together.

In summary, compared with the prior art, the invention includes the following advantages.

1. According to the invention, the at least one shooting target on the game picture in real time is determined according to the judgment condition of the special target and generates the game effect correctly. That is, the at least one shooting target meeting the judgment condition can be realistically hit down on the game picture; and the player can obtain the sum of the odds multiples of the at least one shooting target meeting the judgment condition.

2. The authenticity and playability of the game are improved by realistically presenting the game special effect of the game effect of the special target to improve the attraction of the game.

What is claimed is:

1. A shooting game system for at least one player to play a shooting game to generate a game process, the shooting game including at least one shooting target and a given value as a rate of return to player (RTP), and each of the at least one shooting target including an odds multiple; during the game process, the at least one shooting target randomly displayed on a game picture, and after each player paying a wager score, an attack bullet generated on the game picture to shoot the at least one shooting target displayed on the game picture; and after the attack bullet hitting any one of the at least one shooting target, the shooting game system determining whether the shooting target is hit down according to a first probability, and wherein the product of the odds multiple of the shooting target to be hit and the first probability corresponding to the shooting target is equal to the given value; the shooting game system comprising:

a game processing element, controlling the operation of the shooting game and generating the game picture according to the game process, wherein the at least one shooting target comprising at least one special target, each of the at least one special target is associated with a judgment condition; wherein the game processing element determining according to the judgment condition when the special target appears on the game picture, and the game processing element screens out the at least one shooting target, which meets the judgment condition, from the game picture in real time; and wherein the game processing element calculates the sum of the odds multiples of each of the at least one shooting targets, which meet the judgment condition, and to generate an real-time total multiplier; and wherein the odds multiple of the special target at least comprises the real-time total multiplier;

a display screen, connected with the game processing element and presenting the game picture;

at least one personal operation element, connected with the game processing element, and the at least one personal operation element respectively configured for the at least one player to operate to generate an operation instruction to change the game process, wherein the operation instruction comprises a shooting command; and at least one shooting element, connected with the game processing element, the at least one shooting element respectively corresponding to the at least one personal operation element, and the at least one shooting element receiving the shooting command corresponding to the at least one personal operation element to command the shooting element firing the attack bullet; wherein if the special target is hit by the attack bullet, the game processing element judges whether the special target is hit down at a second probability, and the product of the second probability and the odds multiple of the special target to be hit is equal to the given value; and when the special target is determined to be hit down, the game processing element generates a game effect which is hitting down the at least one shooting target meeting the judgment condition together.

2. The shooting game system according to claim 1, wherein the judgment condition is that the at least one shooting target does not belong to the special target and appears on the game picture.

3. The shooting game system according to claim 1, wherein the judgment condition is that the at least one shooting target does not belong to the special target and is within a specified distance from the special target, and the odds multiple is lower than a specified value.

4. The shooting game system according to claim 1, wherein the judgment condition is that the at least one shooting target does not belong to the special target and comprises a specified characteristic.

5. The shooting game system according to claim 1, wherein the game effect comprises a game special effect and the game picture displays the game special effect.

6. The shooting game system according to claim 1, wherein each of the at least one personal operation element comprises a directional control element and an input interface.

7. The shooting game system according to claim 6, wherein the input interface comprises a wager score key and a function key.

8. The shooting game system according to claim 1, wherein the attack bullet on the game picture flies in a straight line, and the attack bullet is reflected to continue fling in a straight line after the attack bullet colliding with a boundary of the game picture.

9. The shooting game system according to claim 1, wherein the odds multiple of the special target is the sum of the real-time total multiplier and a basic multiple.

\* \* \* \* \*